United States Patent
Matsunaga

(10) Patent No.: US 7,343,948 B2
(45) Date of Patent: Mar. 18, 2008

(54) PNEUMATIC TIRE FOR TWO-WHEELED MOTOR VEHICLES

(75) Inventor: Satoshi Matsunaga, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 435 days.

(21) Appl. No.: 11/139,614

(22) Filed: May 31, 2005

(65) Prior Publication Data

US 2006/0000534 A1 Jan. 5, 2006

(30) Foreign Application Priority Data

Jun. 30, 2004 (JP) .......................... P2004-194134

(51) Int. Cl.
*B60C 9/22* (2006.01)
*B60C 9/20* (2006.01)

(52) U.S. Cl. ...................... 152/531; 152/526; 152/527; 152/533; 152/538

(58) Field of Classification Search ............... 152/526, 152/527, 531, 533, 538
See application file for complete search history.

(56) References Cited

U.S. PATENT DOCUMENTS

| 5,379,818 A | 1/1995 | Suzuki et al. | |
| 5,400,847 A * | 3/1995 | Suzuki et al. | ............... 152/527 |

FOREIGN PATENT DOCUMENTS

| EP | 541 368 A1 | 5/1993 |
| EP | 1 149 714 A2 | 10/2001 |
| EP | 1 149 714 A3 | 10/2001 |
| JP | 01109107 | 4/1989 |
| JP | 02088308 | 3/1990 |
| JP | 06024207 | 2/1994 |
| JP | 2000-38008 A | 2/2000 |

* cited by examiner

Primary Examiner—Adrienne C. Johnstone
(74) Attorney, Agent, or Firm—Birch, Stewart, Kolasch & Birch, LLP

(57) ABSTRACT

A pneumatic tire for two-wheeled motor vehicles 1 comprises a belt layer 7 and a tread reinforcing layer 9 outside of a single carcass ply 6A made of organic fiber cords. The belt layer 7 is comprised of a belt ply 7A in which steel cords are spirally wound substantially parallel to a tire circumferential direction. The tread reinforcing layer 9 is comprised of a reinforcing ply 9A in which organic fiber cords are aligned to be substantially parallel to the tire circumferential direction. A width RW of the reinforcing ply 9A in a tire axial direction is not less than 30 mm and not more than 90% of a tread grounding width CW.

10 Claims, 2 Drawing Sheets

PNEUMATIC TIRE FOR TWO-WHEELED MOTOR VEHICLES

BACKGROUND OF THE INVENTION

1. Field of the Invention

The present invention relates to a pneumatic tire for two-wheeled motor vehicles capable of improving the tire strength without harming the steering stability.

2. Description of the Prior Art

A variety of pneumatic tires for two-wheeled motor vehicles provided with belt layers outside of carcasses of radial structure have been suggested in the past. In these years, particularly those employing so-called jointless belt plies as belt layers in which steel cords are spirally wound in a substantially parallel manner with respect to a tire circumferential direction have been suggested. Since such belt layers exhibit strong constraining force in circumferential directions and further include no joints, they have the advantage of exhibiting superior uniformity. It is another advantage that lack in traction at the time of performing turning movements owing to lack in tread rigidity can be solved, which might cause problems particularly in large-sized vehicles, by the use of steel cords.

However, with such a jointless belt layer, effects of reinforcing the tread portion will become less when compared to a belt layer comprised of conventional cut end plies in which belt cords are mutually crossed and overlapped. Therefore, for clearing the strength test as provided by JIS K6366, it will be necessary to comprise the carcass of a plurality of carcass plies and/or to increase the cord implantation number for the belt layer.

However, the above-mentioned reinforcing methods are disadvantageous in that increases in tire weights are caused in addition to degraded performance of absorbing disturbances and riding comfort. The inventors of the present invention have thus suggested providing a reinforcing layer of thin organic fiber cords outside of the belt layer. However, a simple provision of a reinforcing layer will lead to a new drawback that the rigidity of the tread portion is increased to thus worsen the steering stability at the time of turning.

The present invention has been made in view of the above facts, and it is an object thereof to improve the tire strength in a pneumatic tire for two-wheeled motor vehicles including a jointless belt layer in which steel cords are spirally wound while securing its advantages and further restricting increases in tire weight, degradations in disturbance absorbing performance and riding comfort, and also degradations in steering stability at the time of performing turning movements.

The invention as recited in claim 1 of the present invention is a pneumatic tire for two-wheeled motor vehicles in which a tread width comprises a tire maximum width and in which a tread surface warps in an arc-like manner within a tire meridian section, the tire comprising:

a carcass comprised of a single carcass ply including organic fiber cords that extend between a pair of bead portions in a toroidal manner, a belt layer disposed outside of the carcass in a radial direction and comprised of at least one belt ply formed by spirally winding a tape-like member of small width obtained by coating one or a plurality of steel cords with topping rubber so that the steel cords are substantially parallel to a tire circumferential direction, and a tread reinforcing layer disposed outside of the belt layer in the tire radial direction and comprised of a single reinforcing ply in which organic fiber cords are aligned to be substantially parallel to the tire circumferential direction, wherein the reinforcing ply has a width in a tire axial direction of not less than 30 mm and not more than 90% of a tread grounding width.

In the present specification, the term "tread grounding width" denotes a maximum grounding width in the tire axial direction when standard load is applied to the pneumatic tire for two-wheeled motor vehicles in a standard internal pressure condition and is grounded on a flat surface at a camber angle of 0 degrees. The term "standard condition" denotes a condition in which the tire is assembled to a standard rim and is in a no-load condition filled with standard internal pressure.

The term "standard rim" denotes a rim with standards being defined for each tire within standardizing systems including standards, on which the tires are based, such concretely being a standard rim according to JATMA, a "design rim" according to TRA and a "measuring rim" according to ETRTO. The term "standard internal pressure" denotes an air pressure that is defined by the standards for each of the tires, and it denotes a maximum air pressure according to JATMA, a maximum value as recited in the table of "tire load limits at various cold inflation pressures" according to TRA, and "inflation pressure" according to ETRTO. The term "standard load" denotes a load that is defined by the standards for each of the tires, and it denotes a maximum load performance according to JATMA, a maximum value as recited in the table of "tire load limits at various cold inflation pressures" according to TRA, and "load capacity" according to ETRTO.

In the present specification, the term "substantially parallel to the tire circumferential direction" denotes a condition in which an angle formed with respect to the tire circumferential direction is not more than 5 degrees.

The pneumatic tire for two-wheeled motor vehicles according to the present invention employs a jointless ply in which steel cords are spirally wound as the belt layer. Accordingly, lack in traction during turning movements can be solved particularly in large-sized vehicles while securing superior uniformity. Further, by the provision of a reinforcing ply made of organic fiber cords of specific cord arrangements and width outside of the belt layer, it is possible to improve the tire strength while respectively restricting increases in tire weight, degradations in disturbance absorbing performance and riding comfort and also degradations in steering stability when performing turning movements.

DETAILED DESCRIPTION OF THE PREFERRED EMBODIMENT

One embodiment of the present invention will now be explained on the basis of the drawings.

Figure 1:
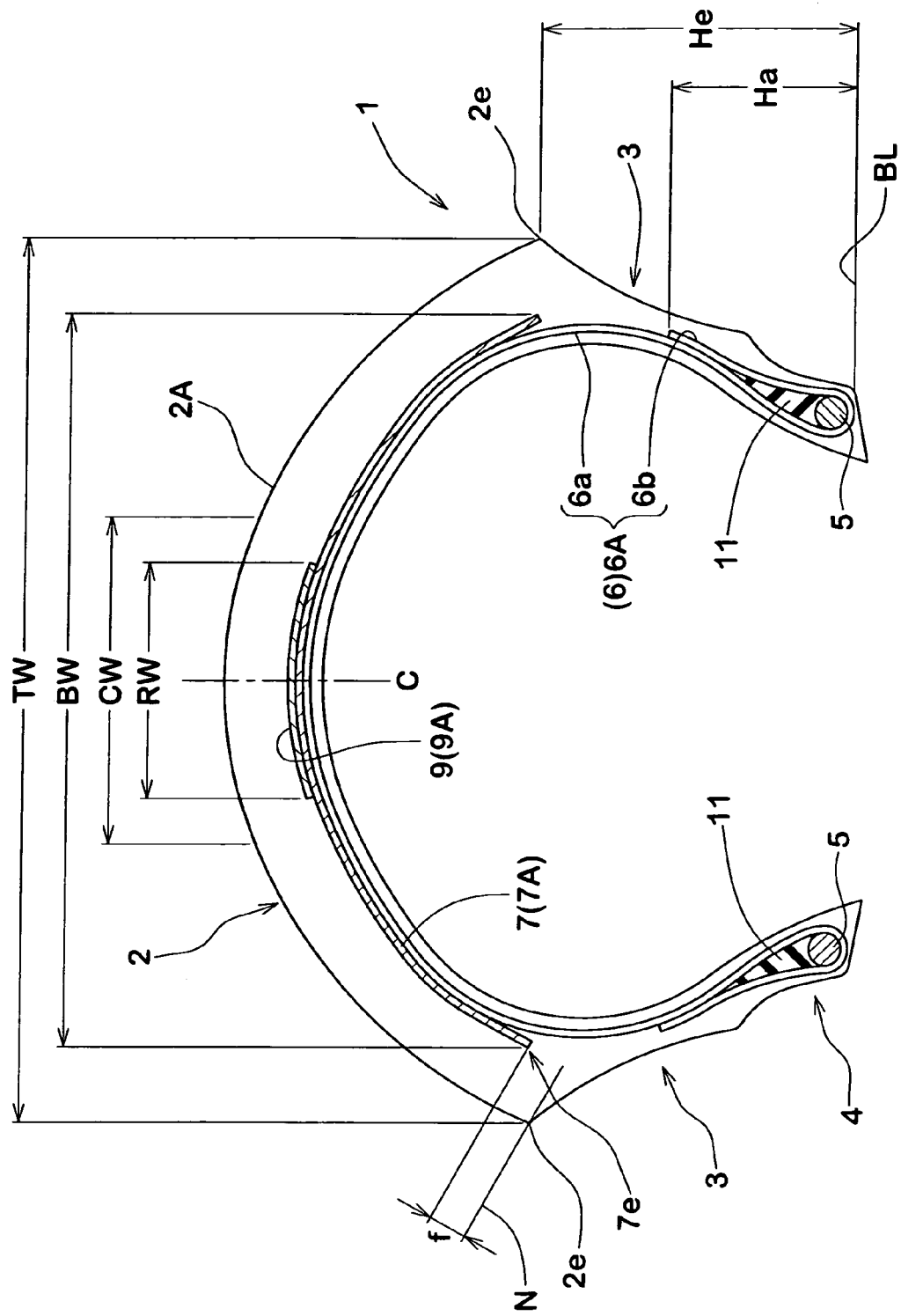
FIG. 1 is a sectional view of the pneumatic tire for two-wheeled motor vehicles according to the present embodiment.
Figure 2:
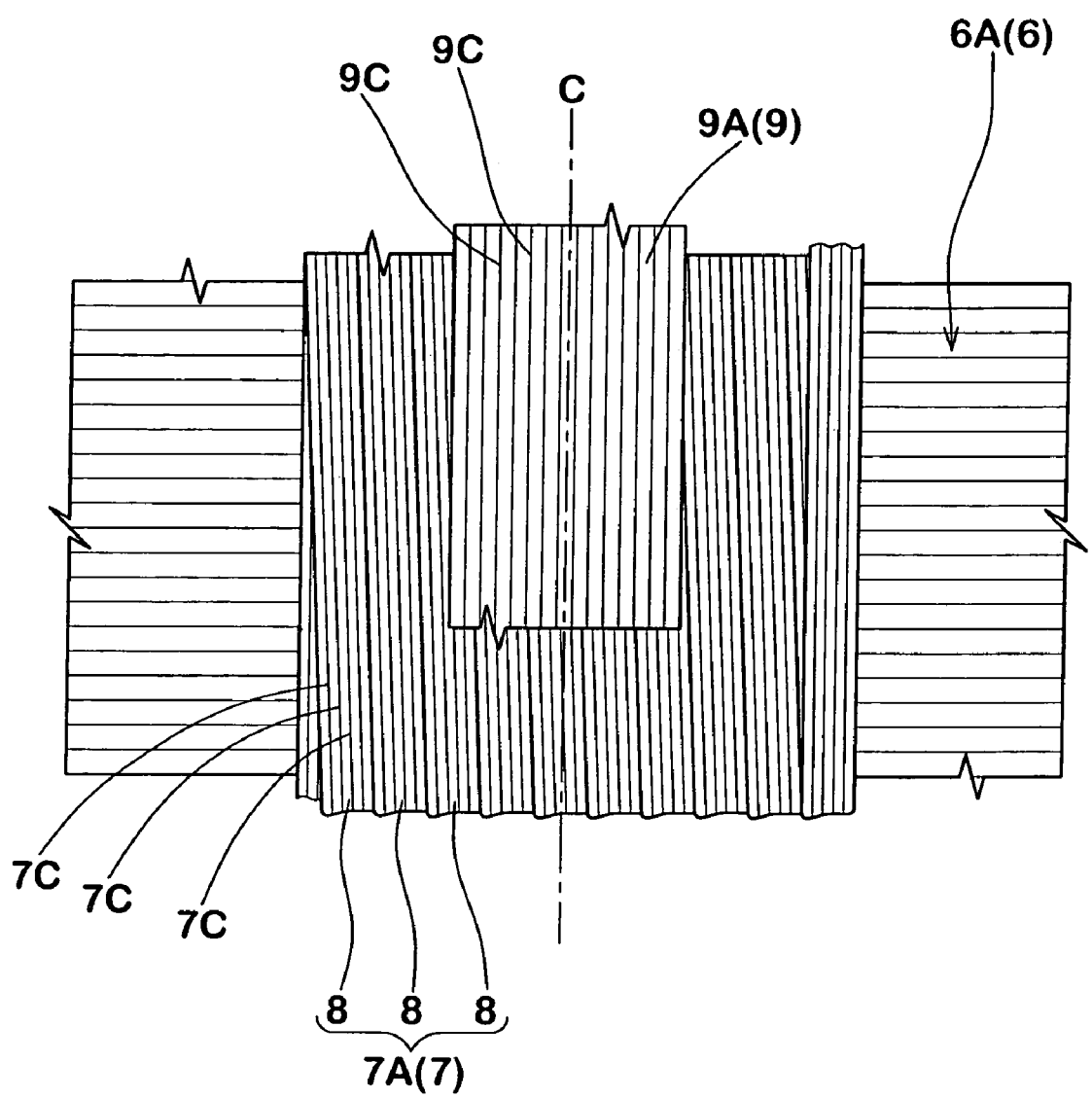
FIG. 2 is an exploded view illustrating a cord alignment condition of a tread portion in exploded form.

FIG. 1 is a meridian sectional view illustrating the pneumatic tire for two-wheeled motor vehicles according to the present invention in a standard condition, and FIG. 2 is an exploded view illustrating an outline of a cord alignment condition of a tread portion. In this respect, the rim has been omitted in FIG. 1.

As illustrated in FIG. 1, the pneumatic tire for two-wheeled motor vehicles 1 comprises a tread portion 2 including a tread surface 2A that grounds on a ground surface, a pair of sidewall portions 3, 3 extending from both ends inward in a tire radial direction, and bead portions 4, 4 positioned at inner ends of the respective sidewall portions 3 in the tire radial direction.

The tread surface 2A extends while smoothly warping in a convex arc-like manner from the tire equator C to tread ends 2e, and a tread width TW, which is a distance between the tread ends 2e, 2e in the tire axial direction, comprises a tire maximum width. With this arrangement, turning movements can be performed at large bank angles.

The tire 1 is further provided with a carcass 6, a belt layer 7 and a tread reinforcing layer 9.

The carcass 6 is comprised of a single carcass ply 6A of radial structure. When the carcass 6 is comprised of two or more carcass plies, the tire weight will be largely increased so that the object of the present invention cannot be achieved. The carcass ply 6A is made of a cord ply in which organic fiber cords are coated with topping rubber, and comprises, in an integrated manner, a ply main body portion 6a extending between the bead portions 4, 4 in a toroidal shape and turnup portions 6b that continue from the ply main body portion 6a and that are turned up around the bead cores 5 of the bead portions 4.

The organic fiber cords of the carcass ply 6A are aligned at an angle of, for instance, 80 to 90 degrees with respect to the tire equator C. The cord material may, for instance, be rayon, nylon, polyester, or aromatic polyamide etc, and particularly rayon that exhibits large strength is desirable. While the mass fineness of cord is not particularly limited, it is desirable to define the same as to be not more than 3300 dtex for favorably balancing the tire weight and required tire strength, to define a cord implantation number per 5 cm of ply width to 30 to 55 (cords/5 cm) and further to 35 to 45 (cords/5 cm). In this respect, in the case of 1650 dtex/2 (two folded yarn structure), the mass fineness of cord is 3300 dtex.

In the carcass ply 6A, while a turnup height Ha, which corresponds to a height in the tire radial direction from the a bead base line BL to outer ends of the turnup portions 6b, is not particularly limited, when it is too small, the lateral rigidity of the tire 1 will fall short while when it is too large, it will lead to increases in the tire weight and worsening of riding comfort. In this aspect, the turnup height Ha is preferably 30 to 100% and further 55 to 90% of a tread end height He, which corresponds to a height in the tire radial direction from the bead base line BL to the tread ends 2e.

The belt layer 7 is comprised of at least one, in the present embodiment, one belt ply 7A that is disposed outside of the carcass 6 in the radial direction. As illustrated in FIG. 2 in schematic form, the belt ply 7A is comprised of a so-called jointless belt ply obtained by spirally winding a tape-like member 8 of narrow width in which a plurality of steel cords 7C are coated with topping rubber such that the steel cords 7C are substantially parallel to the tire circumferential direction. In the present embodiment, the tape-like member 8 is successively wound to extend from one end to the other end of the belt ply 7A in the tire axial direction. However, various winding methods may be employed for securing symmetry with the tire equator C being the center, for instance, winding the tape-like member 8 from the tire equator C side to both outer sides in the tire axial direction or the like.

By employing such steel cords 7C, it is possible to solve the problem of lack in traction during turning movements that might become a problem particularly in large-sized vehicles, without causing lack in rigidity of the tread portion 2, even when employing a spirally wound structure. It is also possible to restrict local deformations of the tread surface 2A and to restrict deflected wear. In this respect, since the cord rigidity of organic fiber cords is excessively small, the traction during turning movements tends to fall short particularly in large-sized vehicles when employing a spirally wound structure. In this respect, when employing a cross ply structure in which organic fiber cords are mutually crossed as the belt layer, joints will be formed in the ply so that the uniformity of the tire cannot be improved, and this will also have adverse effects in terms of high-speed durability.

However, when the steel cords 7C of unnecessary thickness and cord implantation numbers are used, the tread rigidity will become excessively large so that the disturbance absorbing performance and riding comfort will be degraded, and unnecessary increases in tire weight will be caused. Accordingly, for preventing such demerits, appropriateness is achieved by employing thin steel cords 7C and by reducing the cord implantation number and the like. However, the strength of the tread portion 2 (plunger strength) will accordingly become insufficient so that a drawback is presented in that no sufficient tire strength can be secured.

For improving the tire strength without affecting the disturbance absorbing performance, riding comfort and traction performance, the present invention is provided with a tread reinforcing layer 9 of small width in which organic fiber cords are aligned substantially parallel to the tire circumferential direction outside of the belt layer 7 in the tire radial direction.

In this respect, while a width BW of the belt layer 7 in the tire axial direction is not particularly limited, it is desirably larger than a tread grounding width CW and smaller than the tread width TW. More particularly, the width BW of the belt layer 7 is preferably 300 to 370% and further 300 to 360% of the tread grounding width CW. Alternatively, a shortest distance f between the outer ends 7e of the belt layer 7 and a normal line N set at the tread ends 2e is preferably 0 to 15 mm. With this arrangement, a sufficient rigidity can be applied up to the tread ends 2e, and the steering stability when performing turning movements and traction performance can be secured. In this respect, a width center of the belt layer 7 is substantially identical with the tire equator C.

In this respect, for preventing the above-mentioned demerits caused through excessively large tread rigidity such as degradations in disturbance absorbing performance and riding comfort, the cord implantation number is preferably in a range of 20 to 60 (cords/5 cm) and further 25 to 45 (cords/5 cm). It is preferable to employ cords in which a plurality of, for instance, 2 to 4 and preferably three thin wires of 0.14 to 0.20 mm are twisted.

The tape-like member 8 is not limited to the tape-like form as illustrated in the drawings, and it may alternatively be string-like in which a single steel cord 7C is coated with topping rubber. However, when employing a string-like member, the number of winding required for forming the belt ply 7A will be increased so that the productivity is degraded. In view of this fact, the width of the tape-like member 8 is preferably 5 to 50 mm and further 5 to 30 mm. While the number of steel cords 7C within the tape-like member 8 is not particularly limited, either, it is preferably 3 to 10.

Next, the tread reinforcing layer 9 is comprised of a single reinforcing ply 9A in which organic fiber cords 9C are aligned substantially parallel to the tire circumferential direction. A width central line of the reinforcing ply 9A is substantially identical to the tire equator C.

The reinforcing ply 9A may be formed by spirally winding a tape-like member of small width in which one or a plurality of organic fiber cords 9C are coated with topping rubber, similar to the belt ply 7A. However, in view of easy stretching when performing vulcanizing molding, it is alternatively possible to form the same by winding a ply member of large width, in which a plurality of organic fiber cords 9C are coated with topping rubber and which both ends in the circumferential direction have been cut, by a single round in the tire circumferential direction. Since the belt layer 7 will have a jointless structure also in this case, it is possible to secure superior uniformity and high-speed durability.

The organic fiber cords of the reinforcing ply 9A will reinforce a crown region of the tread portion 2 and improves the plunger strength to thus improve the tire strength. However, when the organic fiber cords of the reinforcing ply 9A are inclined at an angle that is larger than 5 degrees with respect to the tire circumferential direction, it will lead to increases in tread rigidity. As a result, the cornering power generated at the time of performing straight-ahead running will become large so that fluctuations in lateral directions are apt to occur, and the steering stability particularly when performing high-speed running will be degraded. Demerits such as degradations in disturbance absorbing performance and riding comfort will also be caused.

A width RW of the reinforcing ply 9A in the tire axial direction is at least not less than 30 mm. When the width RW of the reinforcing ply 9A is less than 30 mm, effects of substantially improving the tire strength cannot be expected. When the width RW of the reinforcing ply 9A becomes large, transient properties when performing turning movements tend to be degraded. That is, when shifting the running mode from straight-ahead running to turning movements (or when shifting to a running mode vice versa), end portions of the reinforcing ply 9A will pass within the grounding surface so that he transient properties of the running mode are worsened. Accordingly, the width RW of the tread reinforcing layer 9 in the tire axial direction is preferably not more than 90%, further not more than 85%, and still further not more than 70% of the tread grounding width CW.

The organic fiber cords 9C of the reinforcing ply 9A are arranged such that the mass fineness D2 of cord is smaller than the mass fineness D1 of the organic fiber cord of the carcass ply 6A. While rayon, nylon, polyester or aromatic polyamide may be employed as the cord material, nylon is particularly preferable which is a material of low elasticity. Particularly, a thin cord having mass fineness D2 of not more than 1880 dtex is preferably used from among nylon cords. The present embodiment employs one of 940 dtex/2, that is, D2=1880 dtex. As for the reinforcing ply 9A, a cord implantation number N2 per 5 cm of ply width is preferably in a range of 50 to 80 (cords/5 cm) and further 55 to 65 (cords/5 cm). While this cord implantation number N2 is larger than the cord implantation number N1 of the carcass ply 6A, a product N2×D2 of the cord implantation number N2 and the mass fineness D2 of cord of the reinforcing ply 9A is preferably smaller than a product N1×D1 of the cord implantation number N1 and the mass fineness D1 of cord of the carcass ply 6A. In this manner, by optimizing the cord angle, the cord material, the cord implantation number N2 and the width RW, it is possible to more effectively improve the tire strength in a pneumatic tire for two-wheeled motor vehicles with a mono-ply carcass comprised of organic fiber cords, without accompanying remarkable increases in tire weight. Moreover, it is possible to prevent a case in which the stability during turning movements is harmed through changes in rigidity of the tread portion 2 or occurrence of excess lateral force.

EXAMPLES

For confirming the effects of the present invention, pneumatic tires for two-wheeled motor vehicles having a tire size 190/50ZR17 were manufactured on trial according to the specifications of Table 1 for testing tire weight, tire strength and steering stability thereof. A carcass ply in which rayon cords (1650 dtex/2) were inclined at 90 degrees with respect to the tire equator was employed as the carcass. A jointless belt ply in which steel cords (3×3×0.17: cord implantation number of 35.7) were spirally wound to be substantially parallel to the tire circumferential direction was employed as the belt layer. A non-jointless reinforcing ply in which nylon cords (940 dtex/2) were aligned to be substantially parallel to the tire circumferential direction was employed as the tread reinforcing layer. The test methods were as follows.

<Tire Weight>

Weights of single tires were measured and indicated as indices with that of Comparative Example 2 being 100. The smaller the value is, the smaller the tire weight is.

<Tire Strength>

Tire breaking energies according to JIS K6366 were measured and indicated as indices with that of Comparative Example 2 being 100. The larger the value is, the higher the tire strength is.

<Steering Stability>

Sample tires were mounted to a rear wheel of a two-wheeled motor vehicle (4 cycles) having a displacement of 1000 cc with conditions for the rim being MT6.00×17 and for the internal pressure 290 kPa. Turning movements were then performed on a dry pavement road and sensory evaluations were made by the driver. Evaluations are indicated as indices with that of Comparative Example 2 being 100, and the larger the value is, the more favorable it is.

Test results are illustrated in Table 1.

TABLE 1

|  | Comparative Example 1 | Comparative Example 2 | Comparative Example 3 | Comparative Example 4 | Example 1 | Example 2 | Comparative Example 5 | Comparative Example 6 | Example 3 | Example 4 | Comparative Example 5 |
| --- | --- | --- | --- | --- | --- | --- | --- | --- | --- | --- | --- |
| Number of carcass plies | 2 | 1 | 1 | 1 | 1 | 1 | 1 | 1 | 1 | 1 | 1 |
| Number of belt plies | 1 | 1 | 1 | 1 | 1 | 1 | 1 | 1 | 1 | 1 | 1 |
| Belt ply ends (cords/5 cm) | 42 | 35 | 35 | 42 | 42 | 42 | 42 | 42 | 42 | 42 | 42 |

TABLE 1-continued

|  | Comparative Example 1 | Comparative Example 2 | Comparative Example 3 | Comparative Example 4 | Example 1 | Example 2 | Comparative Example 5 | Comparative Example 6 | Example 3 | Example 4 | Comparative Example 5 |
|---|---|---|---|---|---|---|---|---|---|---|---|
| Number of reinforcing plies | 0 | 0 | 1 | 1 | 1 | 1 | 1 | 1 | 1 | 1 | 2 |
| Reinforcing ply ends (cords/5 cm) | — | — | 60 | 60 | 60 | 60 | 60 | 60 | 45 | 83 | 60 |
| Width RW of reinforcing ply [mm] | — | — | 60 | 180 | 30 | 40 | 50 | 25 | 40 | 40 | 40 |
| Ratio (RW/CW)[%] | — | — | — | 360 | 60 | 80 | 100 | 50 | 80 | 80 | 80 |
| Test results Tire weight [index] | 120 | 100 | 103 | 113 | 103 | 103 | 104 | 102 | 102 | 110 | 108 |
| Tire strength [index] | 340 | 100 | 180 | 200 | 200 | 200 | 200 | 200 | 170 | 250 | 270 |
| Steering stability [index] | 90 | 100 | 80 | 70 | 100 | 100 | 85 | 100 | 100 | 95 | 70 |

CW = 50 mm

It can be confirmed from the test results that the tire strength of the tires of the examples have improved without accompanying substantial increases in tire weight. It could also be confirmed that no worsening of steering stability was caused.

What is claimed is:

1. A pneumatic tires for two-wheeled motor vehicles in which a tread width comprises a tire maximum width and in which a tread surface warps in an arc-like manner within a tire meridian section, the tire comprising:
   a carcass comprised of a single carcass ply including organic fiber cords that extend between a pair of bead portions in a toroidal manner,
   a belt layer disposed outside of the carcass in a radial direction and comprised of at least one belt ply formed by spirally winding a tape-like member of small width obtained by coating one or a plurality of steel cords with topping rubber so that the steel cords are substantially parallel to a tire circumferential direction, and
   a tread reinforcing layer disposed outside of the belt layer in the tire radial direction and comprised of a single reinforcing ply in which organic fiber cords are aligned to be substantially parallel to the tire circumferential direction,
   wherein the reinforcing ply has a width in a tire axial direction of not less than 30 mm and not more than 90% of a tread grounding width.

2. The pneumatic tires for two-wheeled motor vehicles as claimed in claim 1, wherein the reinforcing ply is formed by winding a ply member of large width obtained by coating a plurality of organic fiber cords with topping rubber and by cutting both ends thereof in the circumferential direction, by a single round in the tire circumferential direction.

3. The pneumatic tires for two-wheeled motor vehicles as claimed in claim 1, wherein the reinforcing ply is formed by spirally winding a tape-like member of small width obtained by coating one or a plurality of organic fiber cords with topping rubber.

4. The pneumatic tires for two-wheeled motor vehicles as claimed in any one of claims 1 to 3, wherein the belt layer is comprised of a single belt ply, and wherein its width BW in the tire axial direction is 300 to 370% of the tread grounding width.

5. The pneumatic tires for two-wheeled motor vehicles as claimed in claim 1, wherein the organic fiber cords of the reinforcing ply are arranged such that a mass fineness D2 of cord is smaller than a mass fineness D1 of the organic fiber cord of the carcass ply.

6. The pneumatic tires for two-wheeled motor vehicles as claimed in claim 5, wherein the organic fiber cords of the carcass ply are comprised of rayon cords and the organic fiber cords of the reinforcing ply are comprised of nylon cords.

7. The pneumatic tires for two-wheeled motor vehicles as claimed in claim 6, wherein the nylon cords of the reinforcing play have a mass fineness D2 of not more than 1880 dtex.

8. The pneumatic tires for two-wheeled motor vehicles as claimed in claim 7, wherein the nylon cords of the reinforcing play have a two folded yarn structure.

9. The pneumatic tires for two-wheeled motor vehicles as claimed in claim 5, wherein the carcass play is arranged such that a cord implantation number N1 per 5 cm of ply width is smaller than the cord implantation number N2 of the reinforcing ply, and wherein a product N1×D1 of the cord implantation number N1 and the mass fineness D1 of cord of the carcass play is larger than a product N2×D2 of the cord implantation number N2 and the mass fineness D2 of cord of the reinforcing ply.

10. The pneumatic tires for two-wheeled motor vehicles as claimed in claim 1, wherein the reinforcing ply is arranged such that cord implantation number N2 per 5 cm of ply width is 50 to 80 (cords/5 cm).

* * * * *